(12) United States Patent
Martens et al.

(10) Patent No.: US 10,486,145 B2
(45) Date of Patent: Nov. 26, 2019

(54) ONE-POT SYNTHESIS OF COPPER CONTAINING SMALL-PORE ZEOLITES

(71) Applicant: Umicore AG & Co. KG, Hanau-Wolfgang (DE)

(72) Inventors: Johan Adriaan Martens, Huldenberg (BE); Sreeprasanth Pulinthanathu Sree, Heverlee (BE); Stef Jules Peter Kerkhofs, Heverlee (BE); Elke Jane June Verheyen, Mechelen (BE); Frank-Walter Schuetze, Aschaffenburg (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 15/765,873

(22) PCT Filed: Oct. 6, 2016

(86) PCT No.: PCT/EP2016/073853
§ 371 (c)(1),
(2) Date: Apr. 4, 2018

(87) PCT Pub. No.: WO2017/080722
PCT Pub. Date: May 18, 2017

(65) Prior Publication Data
US 2018/0304242 A1 Oct. 25, 2018

(30) Foreign Application Priority Data
Oct. 12, 2015 (EP) .................................... 15189310

(51) Int. Cl.
| | | |
|---|---|---|
| B01J 29/06 | (2006.01) | |
| B01J 29/76 | (2006.01) | |
| B01J 29/56 | (2006.01) | |
| B01J 29/072 | (2006.01) | |
| C01B 39/02 | (2006.01) | |
| C01B 39/06 | (2006.01) | |
| B01D 53/94 | (2006.01) | |
| B01J 29/08 | (2006.01) | |

(52) U.S. Cl.
CPC ........ B01J 29/763 (2013.01); B01D 53/9418 (2013.01); B01J 29/072 (2013.01); B01J 29/56 (2013.01); B01J 29/76 (2013.01); B01J 29/7607 (2013.01); C01B 39/02 (2013.01); C01B 39/026 (2013.01); C01B 39/06 (2013.01); B01D 2255/50 (2013.01); B01D 2257/404 (2013.01); B01D 2258/01 (2013.01); B01J 29/08 (2013.01); B01J 2229/18 (2013.01); B01J 2229/183 (2013.01); B01J 2229/186 (2013.01); B01J 2229/20 (2013.01); B01J 2229/34 (2013.01); B01J 2229/40 (2013.01)

(58) Field of Classification Search
CPC ........ B01J 29/76; B01J 29/763; B01J 29/072; B01J 29/7607; B01J 29/56; B01J 2229/40; B01J 2229/34; B01J 2229/18; B01J 2229/183; B01J 2229/186; C01B 39/026; C01B 39/06; C01B 39/02; B01D 53/9418; B01D 2255/50; B01D 2257/404; B01D 2258/01
USPC ...................... 502/60, 74; 423/700, 705, 716
See application file for complete search history.

(56) References Cited

U.S. PATENT DOCUMENTS

| | | | |
|---|---|---|---|
| 2014/0010754 A1* | 1/2014 | Davis ...................... | C01B 39/48 423/704 |
| 2015/0151285 A1* | 6/2015 | Rivas-Cardona ........................... | B01D 53/9418 423/644 |
| 2015/0151286 A1* | 6/2015 | Rivas-Cardona ...... | B01J 29/763 423/703 |
| 2015/0151287 A1* | 6/2015 | Rivas-Cardona ...... | B01J 29/763 423/703 |
| 2015/0151288 A1* | 6/2015 | Rivas-Cardona .... | B01J 37/0225 423/700 |
| 2016/0023913 A1* | 1/2016 | Goel ....................... | C01B 39/42 423/709 |
| 2016/0101415 A1* | 4/2016 | Ji ............................. | B01J 29/70 585/640 |
| 2016/0214867 A1* | 7/2016 | Xie ......................... | C01B 39/06 |
| 2016/0271596 A1* | 9/2016 | Marin ................ | B01D 53/9418 |
| 2018/0057365 A1* | 3/2018 | Zones ..................... | B01J 29/70 |

FOREIGN PATENT DOCUMENTS

WO 2014090698 A1 6/2014

OTHER PUBLICATIONS

Xie et al., "Excellent Performance of One-Pot Synthesized Cu-SSZ-13 Catalyst for the Selective Catalytic Reduction of NOx with NH3", Environ. Sci. Technol., 2014, 48, pp. 566-572.*

(Continued)

Primary Examiner — Elizabeth D Wood
(74) Attorney, Agent, or Firm — Suzannah K. Sundby, Esq.; Canady + Lortz LLP

(57) ABSTRACT

The present invention relates to a process for the manufacture of a copper containing small-pore zeolite which comprises preparing a reaction mixture comprising a zeolite of the faujasite framework type, Cu-tetraethylenepentamine (Cu-TEPA) and at least one compound M(OH)x, which does not comprise the tetraethylammonium cation and heating the reaction mixture to form a copper containing small-pore zeolite.

13 Claims, 1 Drawing Sheet

(56) References Cited

OTHER PUBLICATIONS

Ren et al., "Designed copper-amine complex as an efficeint template for one-pot synthesis of Cu-SSZ-13 zeolite with excellent activity for selective catalytic reduction of NOx by NH3", Chem. Commun., 2011, 47, pp. 9789-9791.*
Martin et al., "Efficient synthesis of the Cu-SSZ-39 catalyst for DeNOx applications", Chem. Commun., 2015, 51, pp. 11030-11033.*
Nedyalkova et al., "Interzeolite Conversion of FAU Type Zeolite into CHA and its Application in NH3-SCR", Topics in Catalysis, vol. 56, Issue 9-10, Jun. 2013, pp. 550-557.*
International Search Report received in PCT/EP2016/073853, dated Jan. 4, 2017.
Written Opinion received in PCT/EP2016/073853, dated Jan. 4, 2017.

* cited by examiner

ONE-POT SYNTHESIS OF COPPER CONTAINING SMALL-PORE ZEOLITES

The present invention relates to a process for the preparation of copper containing small-pore zeolites in a one-step synthesis.

Zeolites are microporous aluminosilicate materials which have very regular pore structures of molecular dimensions and which occur in numerous framework structures. They are classified by the Structure Commission of the International Zeolite Association which defines respective framework types. The commission also assigns framework type codes consisting of three capital letters to all unique and confirmed framework topologies. For example, a widely used group of zeolites belongs to the faujasite framework to which the code FAU has been assigned.

It is also common to classify zeolites according to their pore size which is defined by the ring size of the biggest pore aperture. Zeolites with a large pore size have a maximum ring size of 12 tetrahedral atoms, zeolites with a medium pore size have a maximum pore size of 10 and zeolites with a small pore size have a maximum pore size of 8 tetrahedral atoms. Well-known small-pore zeolites belong in particular to the AEI, CHA (chabazite), ERI (erionite), LEV (levyne) and KFI framework types. Examples having a large pore size are zeolites of the faujasite framework type.

Small-pore zeolites, in particular if cations like copper and iron are included in the zeolite pores, play an important role as catalysts in the so-called Selective Catalytic Reduction (SCR) of nitrogen oxides with ammonia to form nitrogen and water. The SCR process has been widely used to clean up exhaust gases which result from the combustion of fossil fuels, in particular from stationary power plants and from vehicles powered by diesel engines.

While zeolites occur in nature, zeolites intended for use as SCR catalyst or other industrial applications are usually manufactured via synthetic processes.

Many processes are described which start from a source of aluminum and a source of silicon and use a structure directing agent as a template for the structure type to be synthesized. Processes of this type are for example disclosed in WO 2011/064186 A1 and WO2011/157839 A1. The products thus obtained usually contain sodium or quaternary ammonium cations which normally need to be replaced with copper and/or iron cations. This can be done by an additional synthesis step as for example described in WO 2011/073390 A2 and WO 2011/073398 A2.

Chem. Lett., 2014, 43, 302 (Maruo et al.) describe the facile synthesis of high-silica AEI zeolites from FAU zeolites using tetraethylphosphonium hydroxide (TEPOH) as template. This process, however, has the disadvantage that the Si/Al ratio range of the obtained AEI zeolites is very narrow (13-14) and monomeric and condensed phosphate species are formed in the zeolitic pores during the conventional calcination process. The formation of several types of phosphate species results in the blocking of zeolitic pores.

J. Mater. Chem. A, 2015, 3, 857 (Sonoda et al.) describe the hydrothermal conversion of a FAU zeolite into an AEI zeolite using TEPOH as structure directing agent and seed crystals. The conversion was conducted at 150° C. for 7 days. The paper further describes the manufacture of the respective copper-loaded zeolite by a usual impregnation method using copper nitrate.

U.S. Pat. No. 4,544,538 describes the hydrothermal synthesis of small-pore zeolite SSZ-13 with CHA framework type using a source of aluminum and silicon, an alkali hydroxide and an organic structure directing agent, for example N,N,N-trimethyl-1-adamantammonium iodide, N-methyl-3-quinuclidinol iodide or N,N,N-trimethyl-2-ammonium exonorborane. Copper introduction needs to be performed by an additional unit operation such as ion exchange, impregnation and the like. A disadvantage of this approach is the need of expensive templates and an additional processing step for the copper loading.

Also one-pot processes are already known. WO2009/141324 discloses a process for the preparation of a copper containing zeolitic material having CHA framework structure which comprises using a source of aluminum, a source of silicon and a source of copper. Also this process needs a structure directing agent as a template for the CHA framework structure, for example 1-adamantyltrimethylammonium hydroxide and benzyltrimethylammonium hydroxide. This one-pot process for the manufacture of copper containing aluminosilicate zeolites has disadvantages. For example, it involves organic templates as structure directing agents which are usually very expensive.

A one-pot synthesis of copper containing CHA zeolite is also described in WO2015/084817A1, WO2015/084930A1 and US2015/151286. A mixed-template approach is combined with a silica source, alumina source and optional seed crystals of the envisaged zeolite framework. The mixed-template comprises a metal-amine complex, preferably copper tetraethylenepentamine (Cu-TEPA), and a second organic structure direct agent suitable for forming the envisaged zeolite framework, such as N,N,N-dimethylethylcyclohexylammonium, N,N,N-methyldiethyicyclohexylammonium, N,N,N-triethyicyclohexylammonium, benzyltrimethylammonium, tetramethylammonium, 1-adamantyltrimethlylammonium and N,N,N-triethylcyclohexylammonium cations, in the case CHA zeolite framework is preferred.

Chem. Commun. 51 (2015) 9965-9968 (Martin et al.) additionally describes a one-pot synthesis of Cu containing CHA zeolite using a mixed-template of Cu-TEPA and tetraethylammonium hydroxide, a commercial Y zeolite (CBV-720) as silicon and aluminum source, and sodium hydroxide. The final gel had the following molar ratios: 1 $SiO_2$/0.047 $Al_2O_3$/0.05 Cu-TEPA/0.4 TEAOH/0.1 NaOH/5 $H_2O$. Similar, the disadvantage is the use of organic templates which are usually very expensive.

Chem. Comm 47 (2011) 9789-9791 (Ren et al.) describes a one-pot synthesis for a zeolite with the CHA framework type code from a synthesis mixture containing silica sol, sodiumaluminate, sodium hydroxide and a copper complex of $CuSO_4.5H_2O$ with tetraethylenepentamine (Cu-TEPA) in a molar oxide ratio of 3.1-3.8 $Na_2O$; 1 $Al_2O_3$; 200 $H_2O$; 10-35 $SiO_2$; 2-3 Cu-TEPA. The preparation requires a hydrothermal synthesis of 96 h at 140° C. The resulting materials have a Si/Al of 4.05-7.65 and a high CuO loading of 11.89-12.77 wt. %.

Environ. Sci. Technol. 48 (2014) 566-572 (Xie et al.) describes an adjusted synthesis recipe from a synthesis mixture with a molar oxide ratio of 4.93 $Na_2O$; 1 $Al_2O_3$; 200 $H_2O$; 10 $SiO_2$; 1.33 Cu-TEPA and a hydrothermal treatment of 96 h at 140° C. The resulting material has a Si/Al ratio of 4.15 and a CuO and $Na_2O$ content of 12.89 wt. % and 12.41 wt. %, respectively. Ion exchange of the as made zeolite with 1 M $NH_4NO_3$ decreases the CuO and $Na_2O$ content to 3.8 and 1.2 wt. %, respectively.

There is literature describing the role of alkali cations in the formation of zeolites. For example, the $Li^+$ ($H_2O$) complex is already known to act as template for the formation of the ABW framework type (Phys. Chem. Chem. Phys. 12 (2012) 14579-14584). A direct synthesis of Li containing ABW is described in Stud. Surf. Sci. Catal., ed. A. Gédéon, P. Massiani and F. Babonneau, Elsevier, 2008, vol. 174, part A, pp. 185-188. Also the transformation to analcime (ANA framework type) in the presence of CsOH has been repeatedly described in literature (J. Phys. Chem. B 114 (2010) 5747-5754).

The processes for the manufacture of copper containing aluminosilicate zeolites described above have disadvantages. For example, they involve several process steps including crystallization of the final product at about 150° C. and high pressure which results in a high energy consumption and an ion exchange step to remove the excessive copper content.

There is a need for a process for the manufacture of copper containing aluminosilicate zeolites, in particular small-pore zeolites, which is easy to perform while having a reduced energy consumption, yielding the copper zeolite with the desired CuO content between 1 and 10 wt. % and goes without use of expensive templates. In addition, it is desirable to provide a process which is flexible in the sense that it allows to manufacture a wide variety of small-pore zeolites with respect to copper content, Si/Al ratio and SAR, respectively, and framework type.

The inventors of the present invention have now found that it is surprisingly possible to transform zeolites of the faujasite framework type under alkaline conditions in the presence of a copper complex with tetraethylenepentamine (TEPA) to copper containing small-pore zeolites with CuO loading between 1 and 10 wt. %.

The present invention refers to a process for the manufacture of a copper containing small-pore zeolite which comprises preparing a reaction mixture comprising a zeolite of the faujasite framework type, Cu-tetraethylenepentamine (Cu-TEPA) and at least one compound $M(OH)_x$, wherein x is 1 if M is selected from the group consisting of lithium, sodium, potassium, rubidium and cesium, and wherein x is 2 if M is selected from the group consisting of magnesium, calcium, strontium and barium and which does not comprise the tetraethylammonium cation and heating the reaction mixture to form a copper containing small-pore zeolite.

It is obvious for the skilled person that "reaction mixture" refers to an aqueous mixture.

In embodiments of the present invention the reaction mixture does not comprise the tetraethylammonium, tetramethylammonium, N,N,N-dimethylethylcyclohexylammonium, N,N,N-methyldiethylcyclohexylammonium, N,N,N-triethylcyclohexylammonium, benzyltrimethylammonium, 1-adamantyl-trimethlylammonium and N,N,N-triethylcyclohexylammonium cations.

In embodiments of the present invention the reaction mixture does not comprise the N,N-dimethyl-3,5-dimethylpiperidinium cation.

In embodiments of the present invention tetraethylenepentamin is the only organic molecule in the reaction mixture.

Further embodiments of the present invention refer to a process for the manufacture of a copper containing small-pore zeolite which comprises preparing an aqueous reaction mixture consisting of a zeolite of the faujasite framework type, Cu-tetraethylenepentamine (Cu-TEPA) and at least one compound $M(OH)_x$, wherein x is 1 if M is selected from the group consisting of lithium, sodium, potassium, rubidium and cesium, and wherein x is 2 if M is selected from the group consisting of magnesium, calcium, strontium and barium and heating the reaction mixture to form a copper containing small-pore zeolite.

In embodiments of the inventive process it is performed at temperatures of 80 to 150° C., in particular 90 to 98° C.

In further embodiments of the inventive process it is finished within 2 to 31 days.

Zeolites of the faujasite framework type are known and commercially available in a large variety under the name zeolite Y. In particular, a large amount of faujasites with different Si/Al ratios is available which allows easy control of the Si/Al ratio of the resulting copper containing small-pore zeolite.

In embodiments of the inventive process the zeolite of the faujasite framework type has a Si/Al ratio in the range from 2.4 to 30.

Likewise the copper content of the resulting copper containing small-pore zeolite can be easily controlled via the amount of copper complex used in the inventive process.

In embodiments of the inventive process the copper content of the copper containing small-pore zeolite is 1 to 10 wt. %, in particular 2 to 8 wt. % and particularly preferably 4 to 6 wt. %, calculated as CuO and based on the total weight of the copper containing small-pore zeolite.

The copper complexing agent TEPA used in the inventive process is known and commercially available. The Cu-TEPA can be manufactured in line with known processes, see for example Example 1a) below.

In embodiments of the inventive process the copper complex is used in an amount of 0.0001 mole/wt Cu-TEPA/FAU zeolite to 0.0016 mole/wt Cu-TEPA/FAU zeolite.

In the present process the $M(OH)_x$ selected has an impact on the obtained framework type. With other words, the nature of the obtained copper zeolite phase depends on which of Li, Na, K, Rb, Cs, Mg, Ca, Sr and/or Ba hydroxide is used in the presence of Cu-TEPA.

In an embodiment of the present invention the compound M(OH)x is CsOH and the copper containing small-pore zeolite obtained is of the ANA framework type.

In another embodiment of the present invention the compound $M(OH)_x$ is LiOH and the copper containing small-pore zeolite obtained is of the ABW framework type.

In still another embodiment of the present invention the compound $M(OH)_x$ is NaOH and/or KOH and the copper containing small-pore zeolite obtained is of the CHA framework type.

In embodiments of the inventive process $M(OH)_x$ is used in an amount of 0.001 mole/wt $M(OH)_x$/FAU zeolite to 0.025 mole/wt $M(OH)_x$/FAU zeolite.

In embodiments of the inventive process forming and crystallization of the resulting copper containing small-pore zeolite is supported by the addition of seed crystals of the respective framework type.

By selection of specific zeolites of the FAU (faujasite) framework type in combination with Cu-TEPA and compounds $M(OH)_x$, the inventive process allows for the easy manufacture of a big variety of different copper containing small-pore zeolites.

In embodiments of the inventive process copper containing small-pore zeolites of the framework type codes ABW, AEI, AFX, ANA, AU, BCT, BIK, BRE, CAS, CDO, CHA, DDR, EAB, EDI, EEI, EPI, ERI, ESV, GIS, GOO, ITE, JBW, KFI, LEV, LIT, LTA, LTJ, LTN, MER, MON, MTF, NSI, PAU, PHI, RHO, RTH, SFW, THO, TSC, UFI, YUG or ZSM-25, CJS-1, SSZ-15, Nu-32, EU-7, EU-12, Fu-1, UZM-8, UZM-15 and UZM-17 can be obtained.

Figure 1:
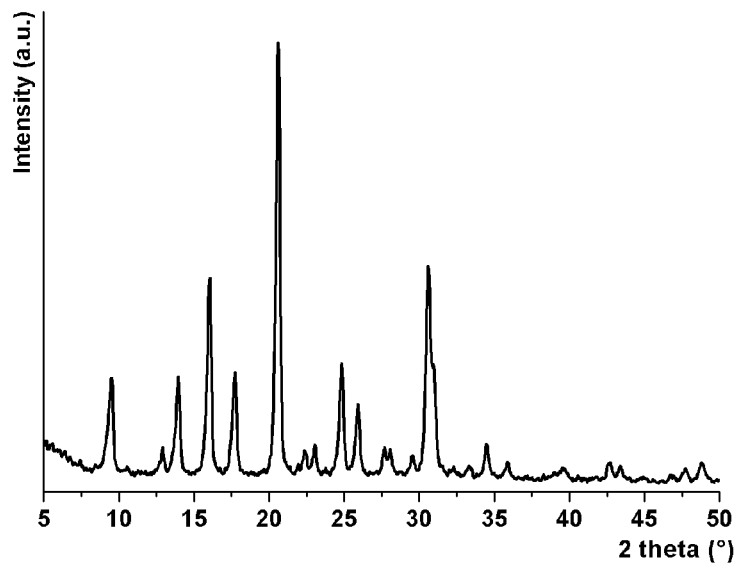
FIG. 1 shows a XRD pattern of a small-pore CHA zeolite according to the invention (Example 1).
Figure 2:
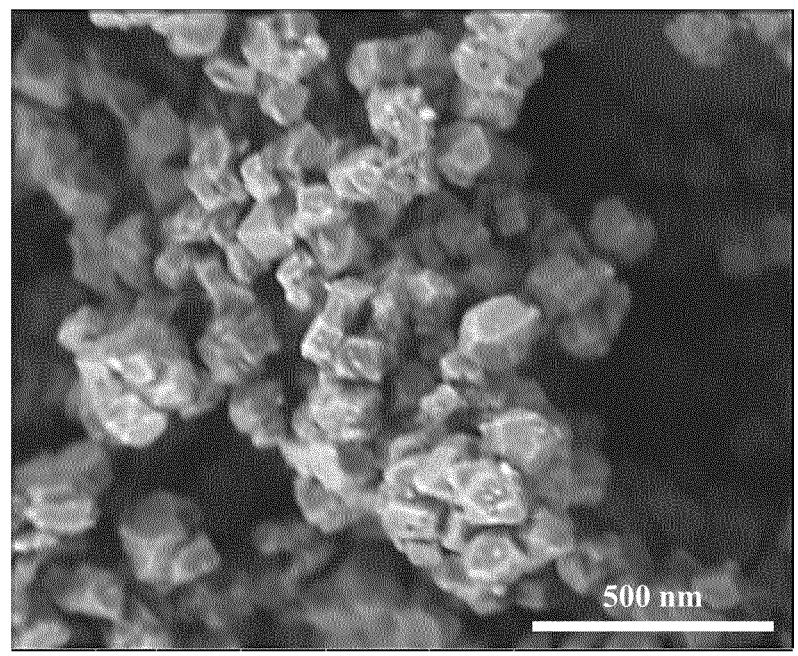
FIG. 2 shows a SEM picture of zeolite according to the invention (Example 1).

EXAMPLE 1 a) Synthesis of Cu-Tetraethylenepentamine complex (Cu-TEPA): 37.9 g tetraethylenepentamine (0.2 mole) was added under stirring to a solution consisting of 50 g $CuSO_4.5H_2O$ (0.2 mole) in 200 g of $H_2O$ (1 M solution) and left to stir for 2 h at room temperature.

b) 3 g of zeolite Y with SAR=30 (Si/Al=15) (CBV720 supplied by Zeolyst International) was suspended in 27 mL of a 1.2 M solution of sodium hydroxide. To this solution 1.5 mL of a 1 M Cu-TEPA solution was added. The final gel had the following molar ratios: 1 $SiO_2$/0.033 $Al_2O_3$/0.033 Cu-TEPA/0.70 NaOH/34 $H_2O$. The suspension was stirred for 10 minutes at room temperature, before being transferred to an oven at 95° C. and left statically for 7 days. After cooling to room temperature, the powder was separated from the mother liquor by filtration, washed with demineralized water and dried at 60° C. for 12 h. The zeolite produced was determined to have the CHA framework type code according to X-ray diffraction (see FIG. 1) with a Si/Al ratio of 4.3 and a CuO content of 7.5 wt. %. FIG. 2 shows the morphology and crystal size of the product obtained.

EXAMPLE 2

A mixture of 1.5 g of zeolite Y with SAR=30 (Si/Al=15) (CBV720 supplied by Zeolyst International) and 1.5 g of zeolite Y with SAR=5.1 (Si/Al=2.55) (CBV300 supplied by Zeolyst International) was suspended in 27 mL of a 1.2 M solution of potassium hydroxide. To this solution 3 mL of a 1 M Cu-TEPA solution was added. The final gel has the following molar ratios: 1 $SiO_2$/0.10 $Al_2O_3$/0.076 Cu-TEPA/0.82 KOH/42 $H_2O$. The suspension was stirred for 10 minutes at room temperature, before being transferred to an oven at 95° C. and left statically for 5 days. After cooling to room temperature, the powder was separated from the mother liquor by filtration, washed with demineralized water and dried at 60° C. for 12 h. The zeolite produced was determined to have the CHA framework type code with a Si/Al ratio of 3.3 and a CuO content of 6.4 wt. %

EXAMPLE 3

Example 2 was repeated with the exception that 27 mL of a 1.2 M solution of sodium hydroxide was issued instead of potassium hydroxide. The final gel has the following molar ratios: 1 $SiO_2$/0.10 $Al_2O_3$/0.076 Cu-TEPA/0.82 NaOH/42 $H_2O$. The zeolite produced after 11 days was determined to have the CHA framework type code with a Si/Al ratio of 2.9 and a CuO content of 8 wt. %.

EXAMPLE 4

6 g of zeolite Y with SAR=12 (Si/Al=6) (CBV712 supplied by Zeolyst International) was suspended in 54 mL of a 1.2 M solution of potassium hydroxide. To this solution 6 mL of a 1 M Cu-TEPA solution was added. The final gel has the following molar ratios: 1 $SiO_2$/0.08 $Al_2O_3$/0.073 Cu-TEPA/0.79 KOH/40 $H_2O$. The suspension was stirred for 10 minutes at room temperature, before being transferred to an oven at 95° C. and left statically for 6 days. After cooling to room temperature, the powder was separated from the mother liquor by filtrations, washed with demineralized water and dried at 60° C. for 12 h. The zeolite produced was determined to have the CHA framework type code with a Si/Al ratio of 3.6 and a CuO content of 5.5 wt. %

EXAMPLE 5

Example 4 was repeated with the exception that 54 mL of a 1.2 M solution of sodium hydroxide was issued instead if potassium hydroxide. The final gel has the following molar ratios: 1 $SiO_2$/0.08 $Al_2O_3$/0.073 Cu-TEPA/0.79 NaOH/40 $H_2O$. The zeolite produced after 31 days was determined to have the CHA framework type code

EXAMPLE 6

2.5 g of zeolite Y with SAR=12 (Si/Al=6) (CBV712 supplied by Zeolyst International) was suspended in 25 mL of a 1 M Cu-TEPA solution. The suspension was stirred for 2 days at room temperature. The solids were recovered by filtration and washing with demineralized water and dried at 60° C. for 12 h. 1 g of the obtained powder was suspended in 9 mL of a 1.2 M solution of potassium hydroxide. The suspension was stirred for 10 minutes at room temperature, before being transferred to an oven at 95° C. and left statically for 2 days. After cooling to room temperature, the powder was separated from the mother liquor by filtrations, washed with demineralized water and dried at 60° C. for 12 h. The zeolite produced was determined to have the CHA framework type code.

EXAMPLE 7

1.5 g of zeolite Y with SAR=12 (Si/Al=6) (CBV712 supplied by Zeolyst International) was suspended in 13.5 mL of a 1.2 M solution of cesium hydroxide. To this solution 1.5 mL of a 1 M Cu-TEPA solution was added. The final gel has the following molar ratios: 1 $SiO_2$/0.08 $Al_2O_3$/0.073 Cu-TEPA/0.79 CsOH/40 $H_2O$. The suspension was stirred for 10 minutes at room temperature, before being transferred to an oven at 95° C. and left statically for 11 days. After cooling to room temperature, the powder was separated from the mother liquor by filtrations, washed with demineralized water and dried at 60° C. for 12 h. The zeolite produced was determined to have the ANA framework type code.

EXAMPLE 8

6 g of zeolite Y with SAR=5.1 (Si/Al=2.55) (CBV300 supplied by Zeolyst International) was suspended in 54 mL of a 1.2 M solution of lithium hydroxide. To this solution 6 mL of a 1 M Cu-TEPA solution was added. The suspension was stirred for 10 minutes at room temperature, before being transferred to an oven at 95° C. and left statically for 5 days. After cooling to room temperature, the powder was separated from the mother liquor by filtrations, washed with demineralized water and dried at 60° C. for 12 h. The zeolite produced was determined to have the ABW framework type code.

EXAMPLE 9

1.5 g of zeolite Y with SAR=12 (Si/Al=6) (CBV712 supplied by Zeolyst International) was suspended in 13.5 mL of a 1.2 M solution of sodium hydroxide. To this solution 1.5 mL of a 1 M Cu-TEPA solution was added. The final gel has the following molar ratios: 1 $SiO_2$/0.20 $Al_2O_3$/0.090 Cu-TEPA/0.98 LiOH/50 $H_2O$. The suspension was stirred for 10 minutes at room temperature, before being transferred to an oven at 95° C. and left statically for 11 days. After cooling to room temperature, the powder was separated from the mother liquor by filtrations, washed with demineralized water and dried at 60° C. for 12 h. The zeolite produced was determined to have the PHI framework type code.

EXAMPLE 10

4.5 g of zeolite Y with SAR=12 (Si/Al=6) (CBV712 supplied by Zeolyst International) was suspended in 40.5 mL of a 1.2 M solution of sodium hydroxide. To this solution 2.25 mL of a 1 M Cu-TEPA solution was added. The final gel has the following molar ratios: 1 $SiO_2$/0.08 $Al_2O_3$/0.036 Cu-TEPA/0.79 NaOH/38 $H_2O$. The suspension was stirred for 10 minutes at room temperature, before being transferred to an oven at 95° C. and left statically for 6 days. After cooling to room temperature, the powder was separated from the mother liquor by filtrations, washed with demineralized water and dried at 60° C. for 12 h. The zeolite produced was determined to be a mixture of CHA and GME framework types.

The invention claimed is:

1. A process for the manufacture of a copper containing small-pore zeolite which comprises
preparing a reaction mixture comprising a zeolite of the faujasite framework type, Cu-tetraethylenepentamine (Cu-TEPA) and at least one compound $M(OH)_x$, wherein M is selected from the group consisting of lithium, sodium, potassium, rubidium, cesium, magnesium, calcium, strontium, and barium, wherein x is 1 where M is lithium, sodium, potassium, rubidium, or cesium, and x is 2 where M is magnesium, calcium, strontium, or barium, and
in the absence of a tetraethylammonium cation, heating the reaction mixture to form the copper containing small-pore zeolite, and
wherein tetraethylenepentamine is the only organic molecule in the reaction mixture.

2. The process according to claim 1, wherein the reaction mixture is an aqueous reaction mixture consisting of the zeolite of the faujasite framework type, the Cu-tetraethylenepentamine (Cu-TEPA), and the at least one compound $M(OH)_x$.

3. The process according to claim 1, wherein it is performed at temperatures of 80 to 150° C.

4. The process according to claim 1, wherein it is performed at temperatures of 90 to 98° C.

5. The process according to claim 1, wherein it is finished within 2 to 31 days.

6. The process according to claim 1, wherein the zeolite of the faujasite framework type has a Si/Al ratio in the range from 2.4 to 30.

7. The process according to claim 1, wherein the copper content of the copper containing small-pore zeolite is 1 to 10 wt %, calculated as CuO and based on the total weight of the copper containing small-pore zeolite.

8. The process according to claim 1, wherein Cu-TEPA is used in an amount of 0.0001 mole/wt Cu-TEPA/FAU zeolite to 0.0016 mole/wt Cu-TEPA/FAU zeolite.

9. The process according to claim 1, wherein the compound $M(OH)_x$ is CsOH and the copper containing small-pore zeolite obtained is of the ANA framework type.

10. The process according to claim 1, wherein the compound $M(OH)_x$ is LiOH and the copper containing small-pore zeolite obtained is of the ABW framework type.

11. The process according to claim 1, wherein the compound $M(OH)_x$ is NaOH and/or KOH and the copper containing small-pore zeolite obtained is of the CHA framework type.

12. The process according to claim 1, wherein $M(OH)_x$ is used in an amount of 0.001 mole/wt MOH/FAU zeolite to 0.025 mole/wt MOH/FAU zeolite.

13. The process according to claim 1, wherein seed crystals of the desired small pore zeolite are added to the reaction mixture.

* * * * *